3,234,389
RANGING SYSTEM UTILIZING X-RAYS
Felix H. Boehm, Altadena, Robert C. Howard, Duarte, Donald E. Wright, Monrovia, and David B. Hakewessell, Altadena, Calif., assignors to Giannini Controls Corporation, Los Angeles, Calif., a corporation of New York
Filed Oct. 8, 1962, Ser. No. 228,908
6 Claims. (Cl. 250—83.3)

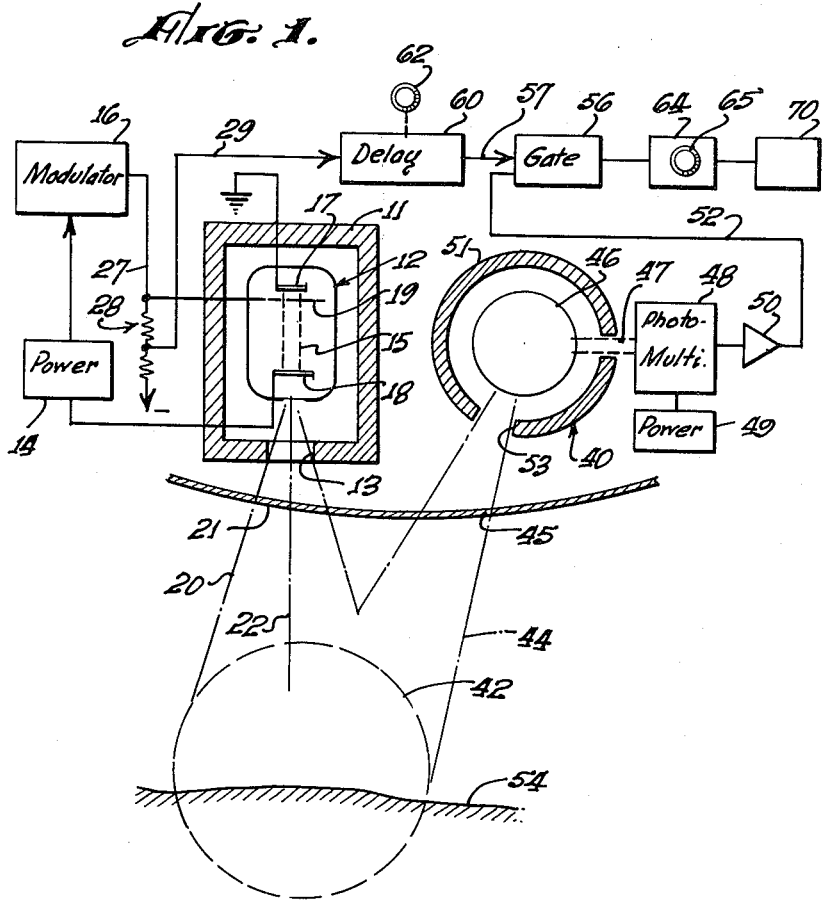
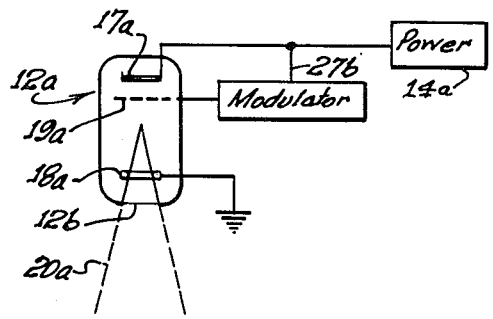
FELIX H. BOEHM,
ROBERT C. HOWARD,
DONALD H. WRIGHT,
DAVID B. HAKEWESSELL,
INVENTORS.
BY
Barkelew & Lewis

United States Patent Office 3,234,389
Patented Feb. 8, 1966

This invention is concerned generally with the measurement of range, as between a rapidly moving vehicle and a target or the like.

The invention is particularly useful for detecting presence of a target from a vehicle which is typically partially or wholly surrounded by a sheath or cloud of material which would interfere with operation of conventional range detecting systems.

Such interference is caused, for example, by the layer of highly ionized gas that typically surrounds a vehicle moving at hypersonic velocity through the atmosphere. That ionized layer, which results from the vehicle shock wave, tends to absorb electromagnetic radiation of radio frequency, making conventional radar unreliable or entirely ineffective as a ranging technique.

Electrostatic detection systems are similarly ineffective in penetrating the ionized layer produced by a normal shock wave. Radar ranging is also severely handicapped by the relatively large reflection from certain types of highly dispersed material, such as condensed moisture and thick dust, for example.

The present invention overcomes such difficulties with previously available ranging systems by utilizing as the sensing medium penetrating radiation having relatively high energy per quantum unit. Such radiation may be of electromagnetic nature, as in the case of X-rays, or may comprise discrete particles such as electrons or neutrons. However, when electromagnetic radiation is utilized in accordance with the invention, its energy range is sufficiently high that the most important interaction mechanism depends upon its photon properties, rather than upon the wave action that is associated with reflection and refraction.

The invention may utilize penetrating radiation throughout a wide range of energies. For systems that require penetration of an atmosphere of appreciable density, it is usually desirable to employ X-rays or electrons of 10 to 50 kev. or more, where 1 kev. stands for 1000 electron volts, and energies up to the maximum that can practicably be generated are useful. For applications in which atmospheric penetration is not required, many advantages of the present invention can be obtained with lower energies. Particularly in the case of neutrons, the increased travel time of the particles with decreasing energy must be taken into account in detailed design of the equipment.

In accordance with the invention, very short pulses of penetrating radiation are generated periodically, preferably in a directed beam. The energy returned by scatter or reflection from the surroundings is detected as a function of the time following each pulse.

In preferred form of the invention, the amplitude of the returned signal is observed at a predetermined time interval following each pulse, as by time-gating of the detection system. Presence of a signal peak at that time provides reliable indication of a target of appreciable area at the range corresponding to the selected time interval.

The penetrating radiation utilized by the invention is essentially unaffected by ionization of the atmosphere, and therefore penetrates the shock wave of a hypersonic vehicle, for example, making range information available under conditions that render conventional ranging techniques completely inoperative.

A full understanding of the invention, and of its further objects and advantages, will be had from the following description of certain illustrative manners of carrying it out. The particulars of that description, and of the accompanying drawings which form part of it, are intended only as illustration and not as a limitation upon the scope of the invention, which is defined in the appended claims.

In the drawings:

FIGURE 1 is a schematic drawing representing, largely in block form, an illustrative embodiment of the invention; and FIGURE 2 is a fragmentary schematic diagram representing a modification.

In the illustrative embodiment of the invention represented in FIG. 1, a source of penetrating radiation is indicated schematically at 12 in the form of an X-ray tube. Tube 12 is typically a triode tube with grounded cathode 17, positive anode 18 maintained at high potential by power supply 14, and control grid 19, variably controlled via the line 27. If preferred, the grid may be grounded, and cathode 17 driven by line 27, the polarity of the control voltage then being reversed. Cathode 17 provides a source of electrons and may comprise, for example, a thermal emission element that is heated directly or indirectly, or a field emission surface. Grid 19 is typically a metallic mesh structure. Anode 18 may comprise a conventional target of tungsten or other suitable material. With negative voltage bias on grid 19 the electrons are effectively stopped. When the grid is driven into conduction at suitable positive voltage, a stream of electrons 15 is accelerated to the anode target. These electrons interact with the target material to produce X-rays of energy characteristic of the material and the applied voltage. For the present purposes a wide variety of X-ray energies may be used. The energy range approximating 50 to 200 kev. average energy is ordinarily particularly effective for systems intended to operate within the atmosphere.

By employing in known manner suitable anode structure supplemented by shielding 11 suitably apertured as indicated at 13, the X-rays produced by tube 12 are preferably substantially limited to a well-defined beam, as indicated schematically at 20. Beam 20 may, for example, occupy a full cone angle of approximately 20°. The beam axis 22 may be oriented in any desired direction, which takes account of the particular ranging operation to be accomplished. Beam 20 extends typically from source 12 within the vehicle through some part of the vehicle wall, represented schematically at 21, to the exterior. Whereas it is ordinarily desirable that wall section 21 include as little mass as possible to minimize loss by scattering and reflection, an important advantage of the invention is that it is not necessary to provide a "window" of any particular type of material for passage of beam 20. That is especially convenient for maintaining full re-entry capability of a missile.

Modulator 16 typically comprises a pulse train generator operating at the desired pulse frequency; and shaping and amplifying means for developing on the line 27 control pulses of suitable form for modulating tube 12. Modulator 16 may be of known type, but is preferably designed, together with tube 12, to produce very short pulses of X-rays. Whereas longer pulses are useful for many purposes, it is usually desirable to limit the pulse length in short range applications to the approximate range from $10^{-7}$ to $10^{-8}$ second, or even less. The pulse frequency is not critical, $10^4$ pulses per second being illustrative. At that pulse rate, a typical re-entry vehicle travels on the order of one foot between pulses. Timing pulses for synchronizing other parts of the system are typically derived from line 27 with suitable attenuation, as by the voltage divider 28, and are supplied via the line 29.

Detector 40 comprises sensing means 46 of any suitable type responsive to X-rays from beam 20 that are scattered or reflected by matter outside of the vehicle. The energy scattered and reflected by such matter is partly directed toward sensor 46, and may be considered to comprise a reflected beam 44. It will be understood, however, that such a beam is highly idealized, since X-rays of the energies typically employed in the invention tend to be scattered substantially isotropically. That reflected energy can typically be transmitted with acceptable loss through a wall portion of the vehicle, as indicated schematically at 45. Wall portions 21 and 45 are preferably, though not necessarily, mutually spaced. Such spacing ordinarily reduces the energy that is scattered directly from wall portion 21 to detector 46. That scattering may be further reduced by suitably designed shielding of the detector from the radiation source, as indicated schematically at 51. That shielding, typically of high density material, may be apertured as at 53 to define the effective input beam 44 to the detector. The geometry of beams 20 and 44 defines a region from which the detected energy is primarily derived. That region is indicated purely schematically at 42. In actual practice, a certain amount of radiation will normally reach the detector directly from source 12 and scattered from various parts of the structure and from the atmosphere. However, such spurious radiation can be compensated by suitable bias or zero adjustment of the detector; and is ineffective when suitable time selection techniques are employed.

A preferred type of sensor 46, which should have a very fast response time, comprises a body of solid light-transmitting material that scintillates strongly when irradiated by X-rays. Many plastic materials are known to have that property, of which terphenyl dissolved in polystyrene is illustrative. The light produced by such scintillation, indicated at 47, is detected photoelectrically, preferably by a photomultiplier tube 48 which may be of known type. A separate high voltage power supply for photomultiplier 48 is indicated at 49. The detailed design of scintillator 46 and photomultiplier 48 is preferably such as to maintain the fast response time of which such devices are capable. That response time is preferably of the same order as the pulse duration of the X-ray pulses in search beam 20. The output from photomultiplier 48 is typically amplified by an amplifier 50 and supplied as a voltage signal to the line 52. Amplifier 50 may be of known type but is preferably designed to provide very rapid response.

When an extended target of material having a density that is high compared to the atmosphere is present in beam 20, as indicated schematically at 54, the returned signal on line 52 displays a pronounced peak at a time, following pulse emission from tube 12, that corresponds to the two-way travel time of the radiation between vehicle and target. In order to detect presence of such a peak corresponding to a selected range, the signal on line 52 may be supplied to a gating circuit, indicated schematically at 56, which may be of known type. Gate 56 is typically normally closed, and is opened in response to a gating pulse received over the line 57. In open condition of the gate, the input signal from line 52 is transmitted, with or without change of amplitude, to the output device 70.

The gating signal on line 57 is typically produced by passing the timing pulses from line 29 through a time delay circuit, indicated schematically at 60. That circuit, which may be of known type, produces a predetermined time delay in the transmitted signal, which delay is preferably adjustable, as by the control knob indicated schematically at 62. Circuit 60 may include suitable means, typically of known type, for sharpening or lengthening the pulses in order to maintain gate 56 open for the desired time interval. Ordinarily it is desirable to make that open time very brief in order to obtain accurate definition of the target range.

Due to the quantum nature of the interaction of the penetrating radiation utilized by the invention, the light emitted by scintillator 46 may be considered to comprise discrete bursts of light in response to each individual quantum of received radiation. However, the intensity emitted by source 12 during the very brief duration of each pulse is typically so high that the individual photon pulses are spaced too closely in time to be resolved by the detector circuitry. The output signal on line 52 is therefore typically essentially of analogue type. The intensity of that signal may be considered as a measure of the rate of photon reception by sensor 46. That signal is preferably corrected for the background radiation caused by spurious reflection from the apparatus itself and from the atmosphere surrounding the vehicle. Such correction may be made by means of a differential amplifier, indicated schematically at 64, which compares the signal pulse from gate 56 with a bias signal that represents the background radiation at the gating period. That bias may be adjustable in accordance with such factors as gating time and atmospheric density, as by the adjustment indicated schematically at 65.

The resulting signal pulse from differential amplifier 64 may be amplified or otherwise modified by means not shown, and is then supplied to any desired utilization device, indicated schematically at 70. That device may, for example, include a recorder or computer, or may comprise a control system for performing some predetermined control action in response to detection of a target at designated range. Such utilization devices are well known, in and of themselves, and need not be described in detail.

Whereas the described use of X-rays as sensing medium has many outstanding advantages for the purposes of the present invention, other types of penetrating radiation may also be employed. Apparatus is well-known, for example, for producing a pulsed beam of neutrons, which may be utilized in place of the X-ray beam represented at 20 in FIG. 1. Neutrons scattered by matter 42 in the beam may be sensed by a scintillator, as indicated at 46, but utilizing a suitable sensitive material that is responsive to neutrons, such as boron trifluoride, for example.

A source of penetrating electrons may be constructed essentially like X-ray source 12 of FIG. 1, but utilizing an anode of grid type, for example, in place of X-ray target 18. Such an electron source is represented schematically at 12a in FIG. 2. The grounded anode 18a is shown of annular form and is designed in known manner to produce desired focussing of the output electron beam 20a. Negative accelerating voltage is supplied from power supply 14a to the cathode 17a. The modulating voltage is supplied to grid 19a and is referenced to the cathode, as indicated by the line 27b. Suitable window structure for transmitting the electron beam is indicated schematically at 12b.

We claim:
1. A system for detecting proximity of a vehicle to an object, comprising in combination
   a source energizable to project from the vehicle a beam of penetrating radiation characterized by energy per quantum exceeding about 10,000 electron volts, and that is appreciably scattered by the atmosphere,
   means for pulsing the source periodically to emit radiation pulses of duration short compared to the period between pulses,
   sensing means responsive to individual quanta of said radiation reflected back to the vehicle by matter in the path of the beam, means controlled by the sensing means for producing an electrical signal of analogue type representing the average intensity of such reflected radiation, and discriminating means for detecting deviations of the signal from a value corresponding to normal atmospheric reflection.

2. A system for detecting proximity of a vehicle to an object, comprising in combination a source energizable to project from the vehicle a beam of penetrating radiation characterized by energy per quantum exceeding about 10,000 electron volts, and that is appreciably scattered by the atmosphere, means for pulsing the source periodically to emit radiation pulses of duration short compared to the period between pulses, sensing means for producing a signal of analogue type that continuously represents the intensity of radiation reflected back to the vehicle by matter in the path of the beam, and means responsive to the amplitude of said signal at a predetermined time following each successive pulse emission.

3. A system for detecting proximity of a vehicle to an object, comprising in combination an X-ray tube mounted in the vehicle, means for pulsing the tube periodically to emit from the vehicle a pulsed beam of X-rays of pulse duration short compared to the period between pulses, sensing means for producing a signal that represents the X-ray intensity from individual pulses of said beam reflected back to the vehicle by matter in the beam path, means for gating said signal at a predetermined time following each pulse emission, means for producing a reference signal representing the normal background signal at said time, and means for comparing the gated signal with the reference signal to produce an output control signal.

4. A system for detecting proximity of a vehicle to an object, comprising in combination an X-ray tube mounted in the vehicle, means for pulsing the tube periodically to emit from the vehicle a pulsed beam of X-rays of average energy between about 50,000 and about 200,000 electron volts and of pulse duration of the order of $10^{-7}$ to $10^{-8}$ second, sensing means having an output corresponding to the intensity of said X-rays reflected back to the vehicle by matter in the beam path, and output means responsive to the sensing means output at a predetermined time following said pulse emission.

5. A system as defined in claim 4, and wherein said output means comprise means for gating the output of said sensing means at said predetermined time, means for producing a reference signal representing the normal background signal at said time, and means for comparing the gated signal with the reference signal to produce an output control signal.

6. A system as defined in claim 4, and wherein said sensing means comprise a body of solid light-transmitting material that scintillates when irradiated by X-rays, and photoresponsive means for producing an electrical signal that varies effectively continuously with the intensity of scintillation of said body, said output means being responsive to the electrical signal.

References Cited by the Examiner
UNITED STATES PATENTS 2,721,275  10/1955  Jackson _____ 345—5 XR
2,996,946  8/1961  Brendholt _____ 343—13 XR RALPH G. NILSON, *Primary Examiner.*

CHESTER L. JUSTUS, *Examiner.*